Figure 1:
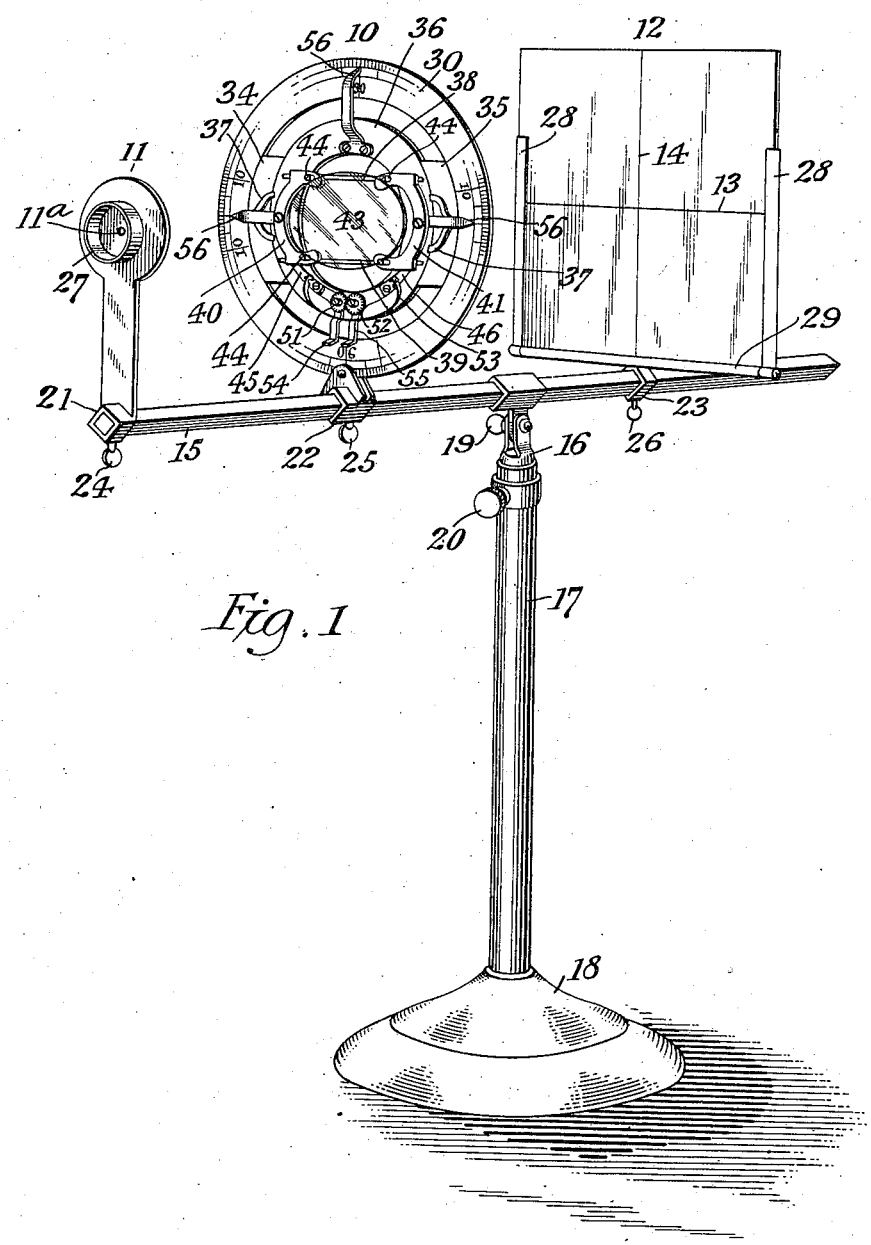

C. M. HAYNES.
AXIOMETER.
APPLICATION FILED NOV. 3, 1910.

996,017.

Patented June 20, 1911.

2 SHEETS—SHEET 1.

Witnesses.
Bert B. Sandman
Louis J. Schilling

C. M. Haynes, Inventor
By his Attorney
S. S. Dunham

C. M. HAYNES.
AXIOMETER.
APPLICATION FILED NOV. 3, 1910.
996,017.
Patented June 20, 1911
2 SHEETS—SHEET 2.
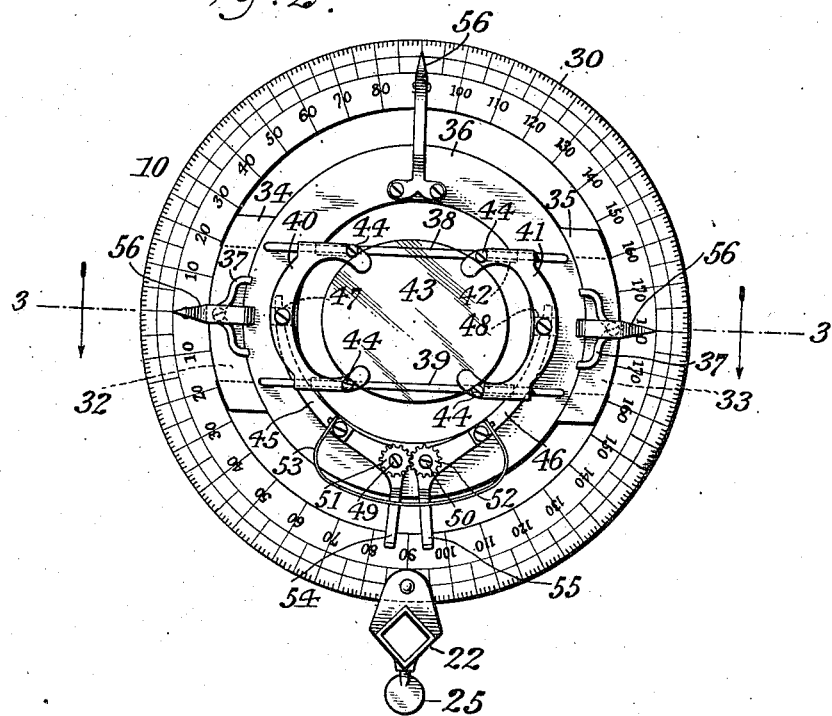
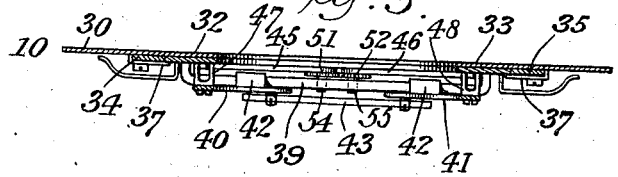

UNITED STATES PATENT OFFICE.

CHARLES M. HAYNES, OF CHILLICOTHE, OHIO.

AXIOMETER.

996,017.  Specification of Letters Patent.  Patented June 20, 1911.

Application filed November 3, 1910. Serial No. 590,417.

*To all whom it may concern:*

Be it known that I, CHARLES M. HAYNES, a citizen of the United States, residing at Chillicothe, in the county of Ross and State of Ohio, have invented certain new and useful Improvements in Axiometers, of which the following is a full, clear, and exact description.

In fitting lenses to the eyes for the correction of astigmatism the oculist or optometrist often finds it desirable to determine the position of the axis of the cylindrical lens or lenses furnished on prescription by the optician, in order to ascertain whether or not the prescription has been correctly filled. A number of devices have been proposed for thus finding the position of the axis, that is, the angle which it makes with the horizontal or the vertical diameter of the lens, but the devices which I have been able to find on the market have all possessed defects or limitations which militate seriously against their accuracy or their convenience of manipulation.

It is accordingly the chief object of my present invention to provide an improved device, which may be aptly termed an "axiometer" or axis-finder, whereby the angular position of the axis can be found readily and with all necessary accuracy.

A further object is to provide in a device for this purpose means for holding and centering the lens, without at the same time subjecting the lens to undue pressure or stress such as would be liable to cause chipping or breakage of the glass.

Another object is to simplify the construction generally, so that a durable device, of minimum liability of derangement, can be produced at low cost.

To these and other ends the invention consists in the novel features of construction and combinations of elements hereinafter described.

It will be recognized by those skilled in the art that the invention can be embodied in a variety of structures, but of these embodiments I have selected for illustration and specific description herein the one which at the present time I consider to exhibit the various features of the invention in their most convenient and effective form. This embodiment is shown in the accompanying drawings, in which—

Figure 1 is a perspective view of the complete instrument. Fig. 2 is a front elevation of the lens-holding device and the graduated circle on which the position of the axis is read. Fig. 3 is a cross section on line 3—3 of Fig. 2.

In its preferred form the instrument consists essentially of three parts, namely, a lens-holding and centering device and a graduated circle, the two being combined in the part designated generally by 10; a sighting device 11, in front of the lens-holder, having a relatively small sighting aperture 11$^a$; and a target or index card behind the lens-holder, having on its front surface horizontal and vertical lines 13, 14, the two crossing at the precise point where the line of sight from the sighting aperture through the center of the lens strikes the card; the parts named being adjustably mounted on a supporting bar 15 and so proportioned that the said line of sight will be perpendicular to the lens and to the index card or target. This supporting bar is itself pivotally mounted on a rod or tube 16 telescoping in a tubular standard 17 on a suitably weighted base 18. By means of the thumb-screw 19 the supporting bar 15 can be secured in any position of pivotal adjustment, and by means of a set screw 20 the rod 16 can be secured to any desired height, as may suit the convenience of the user. The supporting bar 15 is square or of knife-edge form in cross section, as shown, and the parts supported by the same are mounted thereon by means of sleeves 21, 22, 23, of corresponding form so that the parts referred to will always be upright. The supporting sleeves are slidable on the bar, to space the parts properly, and are provided with set screws 24, 25, 26, by which the sleeves and the elements carried thereby may be securely fastened in adjusted position.

The sighting device is simply an upright plate of sheet metal, with a disk-like top in which the sighting aperture 11$^a$ is formed, the aperture being encircled by a short concentric shade-tube or flange 27 on the front of the disk.

The index card 12, of card-board, celluloid, or other suitable material, preferably opaque, is removably carried in slotted guides 28 extending upwardly from a cross bar 29 on the sleeve 23. The test lines 13, 14, may be ruled in ink where paper or cardboard is used, or scratched in the surface of a celluloid card.

In the present form of my invention the circular scale, meaning thereby any suitable scale for measuring angles in "circular" measure, finds embodiment in a flat annulus or "circle" 30, graduated in degrees, and firmly attached to the adjustable carrying sleeve 22. Attached to or integral with the circle and extending inwardly and horizontally are two wide arms 32, 33, provided in front with arc-shaped guides 34, 35, concentric with the graduated circle, and rotatably mounted on the arms between the guides mentioned is a lens-carrying element in the form of a flat annulus 36, concentric with the said circle, the annulus being retained in place by fingers 37 extending over its edge from the guides 34, 35.

On the front of the annulus 36, on opposite sides of its center and at equal distances therefrom, are two parallel rails 38, 39, and on the two rails two lens-clamping members 40, 41 are slidably mounted by means of tubular slides 42. These lens-clamps or clamping members are curved, being concave toward the center of the annulus, so that only their arms will, when the device is in use, extend inwardly beyond the annulus, the object being to cover or screen as little as possible of the central opening. The lens, shown at 43, rests against these arms, and is held thereon by four forwardly extending studs 44, so arranged that the line joining each stud with the other stud on the same clamping member is perpendicular to the rails. In other words the upper and lower studs lie in lines perpendicular to the paths in which they move. The result is that with a circular or a symmetrically oval lens if either stud is in contact with the edge of the lens the other stud on the same clamping member will also be in contact with the lens edge when the longer diameter is parallel with the rails 38, 39. Consequently, if both clamps are moved inwardly the same distance, into engagement with the lens-edge, the lens, if not already in the center of the annulus with its longer diameter horizontal, will be moved to right or left, as the case may be, and turned in its own plane in one direction or the other, and will thus be brought to the desired central position, with its longer diameter in close parallelism with the rails. For the purpose of thus shifting the clamps equally I provide a pair of curved actuating arms 45, 46, the upper ends of which pass loosely through slotted lugs 47, 48 on the rear faces of the clamps, while their lower ends are fulcrumed at adjacent points, on the pivots 49, 50, fastened to the annulus 36. Concentric with these pivots and fixed to the clamps are two intermeshing gears 51, 52. It will therefore be seen that if either arm be moved on its pivot, thereby shifting the associated clamp, the other arm and its clamp must, by reason of the two gears, have an equal movement in the opposite direction. These arms are urged yieldingly toward the center of the annulus, and with them the two lens-clamps, by a light spring 53. Extending downwardly from the arms are two finger pieces 54, 55, having their free ends bent forwardly, so that by pressing the same together the clamps will be separated equally, against the light tension of the spring 53.

As previously stated, the annular lens-carrier 36 is rotatable concentrically with the graduated circle 30. For the purpose of reading off the angle through which the carrier is turned in using the instrument the carrier is provided with one or more indexes or pointers 56 extending into proximity to the graduations on said circle.

The operation of the instrument is as follows: The lens-clamps 40, 41, being opened by pressing the finger pieces 54, 55 together, the lens which is to be tested is placed between the clamps with its longer diameter approximately parallel to the rails 38, 39 and preferably with the outer side of the lens, that is, the side facing out when the lens is worn, next to the target. The finger pieces are then released allowing the spring 53 to bring the clamps gently against the edge of the lens, thereby positioning and centering the same as previously described. Bringing the longer axis of the lens to the horizontal, by turning the lens-carrier 36 till the proper index 56 points to zero on the circle 30, the operator observes the test-lines 13, 14, through the sighting aperture 11ᵃ and the lens. If the lens has no cylindrical surface, or if the axis of its cylindrical surface is parallel to either test-line, no distortion of either line as seen through the lens will be observed; but if the axis of such surface is not parallel to one line or the other such portions of both lines as are seen through the lens will appear to have undergone a partial rotation about their point of intersection, thereby causing the lines to appear broken at the edge of the lens. The operator now turns the lens carrier until the portions of the lines seen through the lens are brought into coincidence, or alinement, with the portions seen outside the lens. The axis of the cylindrical surface is now parallel to one or the other of the test lines, and the angle through which the lens has to be turned from the zero position of the indexes 56 to produce such parallelism is indicated on the circle 30. This angle is the one which the operator in testing the lens desires to find, namely, the angle between the axis of the cylindrical surface and the diameter selected as the basis of measurement. If the lens has also a spherically curved surface the latter may be neutralized by placing against the lens which is to be tested another lens having a spherical surface of the same focal length but opposite curvature, but having no cylindrical surface; that is, a plano-convex or plano-concave lens, as the case may be. If the focal length of the spherical surface of the lens which is to be tested is not known it can of course be readily found by means of an optician's spherometer.

As previously stated, the instrument herein specifically described is merely the preferred form of the invention, which may be embodied in other forms without departure from its proper spirit and scope as defined by the appended claims.

What I claim is:

1. In an axiometer, the combination of a rotatable carrier, lens-holding mechanism mounted on the carrier, yielding actuating means associated with said mechanism to cause the same to engage the lens and bring the center of the lens into alinement with the axis of rotation of the carrier, manual means for actuating said mechanism to release the lens, a circular scale and an index associated with the carrier, and a target having a test-line in position to be observed through the lens and outside of the lens simultaneously.

2. In an axiometer, the combination of a rotatable centrally open carrier, a rail mounted on the carrier and extending transing means constantly urging the clamping members slidably mounted on the rail, yielding means constantly urging the clamping members toward the axis of rotation of the carrier, manual means operable against the tension of said yielding means to shift the clamping members outward, a circular scale and an index associated with the carrier, and a target having a test-line in position to be observed through the lens and outside of the lens simultaneously.

3. In an axiometer, the combination of an element consisting of a centrally open carrier, lens-centering and holding mechanism mounted on the carrier, yielding actuating means to cause said mechanism to engage the lens and center the same, manual means for actuating said mechanism to release the lens, an element consisting of a target having a test-line in position to be observed through the lens and outside of the same simultaneously, one of said elements being rotatable and a circular scale and an index associated with the rotatable element.

4. In an axiometer, the combination of a centrally open carrier, lens-clamping members mounted on the carrier and movable transversely of the carrier in alined paths, movable arms connected with the respective clamping members, intermeshing toothed elements connecting the arms together whereby the movements of the clamping members are made equal in extent and opposite in direction, and yielding means to urge the clamping members toward each other.

5. In an axiometer, the combination of a centrally open carrier, lens-clamping members mounted on the carrier and movable transversely thereof in alined paths, movable arms connected with the respective clamping members to actuate the same, intermeshing toothed elements connecting the arms together whereby the movements of the clamping members are made equal in extent and opposite in direction, a spring arranged to urge the said arms toward each other, and manual means for separating the arms against the tension of the spring.

6. In an axiometer, the combination of a centrally open carrier, a graduated circle constituting a support for the carrier, in which the carrier is rotatably and concentrically mounted, lens-holding and centering mechanism on the carrier and rotatable therewith, a supporting bar on which the graduated circle is slidably mounted, a target having a test line, slidably mounted on the supporting bar behind the said circle and carrier, and a sighting device mounted on the supporting bar and in front of the circle and carrier and having a sighting aperture.

7. In an axiometer, the combination of an annular carrier, arc-shaped symmetrical lens-clamping members movable transversely of the carrier in alined paths, yielding means urging the clamping members toward each other whereby to grip yieldingly a lens placed between them, and manual means for separating the clamping members to release the lens therefrom.

8. In an axiometer, the combination of a centrally open carrier, transverse parallel rails mounted on the carrier, lens-clamping members slidably mounted on the rails, means associated with the clamping members for making the movement thereof equal in extent and opposite in direction, and yielding means for urging the clamping members toward each other whereby to grip yieldingly a lens placed between the same, and manual means for separating the clamping members to release the lens therefrom.

9. In an axiometer, the combination of a rotatable lens-carrier, a non-rotatable graduated circle constituting a support for the carrier, a pointer mounted on the carrier and coöperating with the graduated circle, a target-holder behind the lens-carrier, a target removably mounted in said holder and having a test line in position to be observed through the lens and outside the lens simultaneously, a sighting device in front of the lens-carrier and having a sighting aperture, and a support on which the graduated circle, the target-holder, and the sighting device are adjustably mounted.

In testimony whereof I affix my signature in the presence of two subscribing witnesses.

CHARLES M. HAYNES.

Witnesses:
 WILBY G. HYDE,
 HAZEL C. HOUGH.